A. H. WHITTICK
SUBSOIL PLOW.
No. 118,890. Patented Sep. 12, 1871.
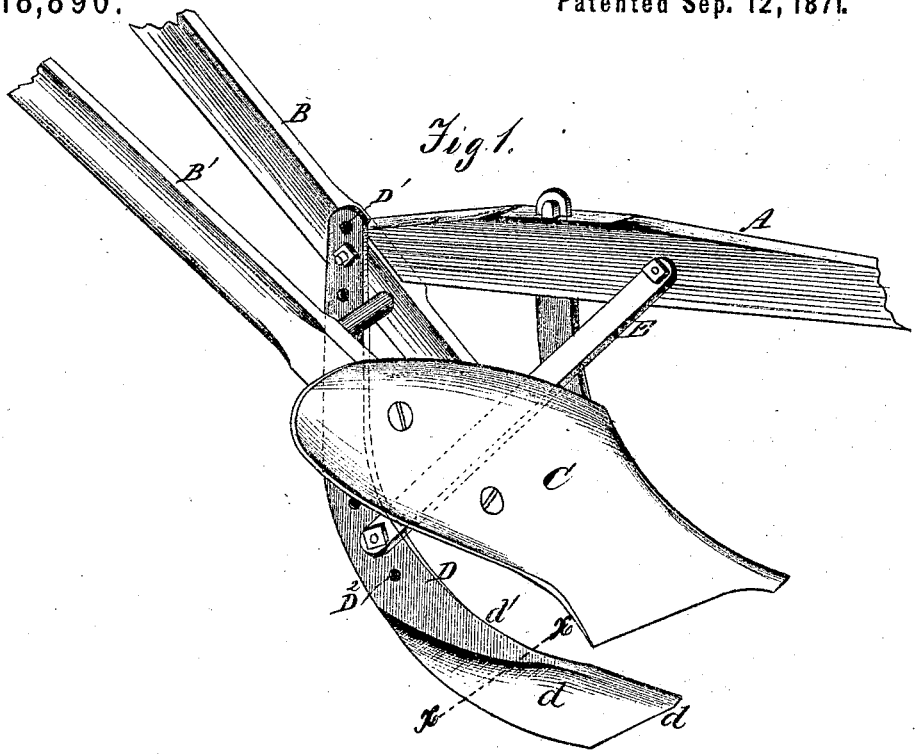
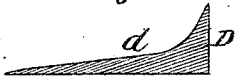
Witnesses.
A. H. Whittick
Inventor

UNITED STATES PATENT OFFICE.

ALEXANDER H. WHITTICK, OF CLARKSVILLE, INDIANA.

IMPROVEMENT IN PLOWS.

Specification forming part of Letters Patent No. 118,890, dated September 12, 1871.

*To all whom it may concern:*

Be it known that I, ALEXANDER H. WHITTICK, of Clarksville, in the county of Clark and State of Indiana, have invented a new and useful Improvement in Subsoil-Plows; and I do hereby declare the following is a full, clear, and exact description of the same, reference being had to the annexed drawing making part of this specification, in which—

Figure 1 is a perspective view of a plow with my subsoil attachment. Fig. 2 is a section on the line $x\,x$ of Fig. 1.

The same letters are employed in both figures in the designation of identical parts.

My invention relates to a subsoiling attachment which may be connected with any of the breaking-plows in common use, and which may be adjusted so as to cut at a greater or lesser depth, as desired.

In the annexed drawing, A is the beam, B B' the handles, and C the land-side of an ordinary breaking-plow. D is the subsoiling attachment. It is bent in the form shown in the drawing, the top part being nearly vertical and the point $d$ horizontal. The point is widened, as shown, to throw up the subsoil, and the stem made sharp upon the edge at $d'$, to cut roots and pass through the hard earth with a minimum of resistance. At the top of the stem or stock are a series of holes, D', through which a bolt may be passed to attach it adjustably to the rear end of the beam, or to the handle B, or to both. Another series of bolt-holes are formed through the stem at $D^2$, by means of which a brace, E, connecting it with the beam A, may be in like manner adjustably attached to regulate the operation of the cutting-point $d$.

It is evident that the plow may be used with or without the subsoiling attachment; or, in other words, by the use of my improvement common plows may be converted into subsoil-plows at a very small cost, thus saving to farmers the greater part of the cost of a heavy and expensive plow not adapted to the ordinary work required on the farm.

I am aware that subsoil-cutters have been attached to other plows, and I do not, therefore, claim broadly this combination; but

What I claim as my invention, and desire to secure by Letters Patent, is—

1. The subsoil attachment D, a section of which at $x\,x$ presents the form substantially as shown in Fig. 2.

2. The combination of the subsoil attachment D, a section of which at $x\,x$ presents the form substantially as shown in Fig. 2, with the beam A of an ordinary plow, and the adjustable brace E, arranged in relation to one another as set forth.

In testimony whereof I have signed my name to this specification in the presence of two subscribing witnesses.

ALEX. H. WHITTICK.

Witnesses:
THOS. D. KENNEDY,
CHARLES JOHNSON.